US006827647B1

(12) United States Patent
Loose et al.

(10) Patent No.: US 6,827,647 B1
(45) Date of Patent: Dec. 7, 2004

(54) GAMING MACHINE COIN HANDLING SYSTEM WITH DEDICATED LOCAL MICROCONTROLLER

(75) Inventors: Timothy C. Loose, Chicago, IL (US); William A. Gwiasda, Chicago, IL (US)

(73) Assignee: WMS Gaming, Inc., Chicago, IL (US)

( * ) Notice: Subject to any disclaimer, the term of this patent is extended or adjusted under 35 U.S.C. 154(b) by 157 days.

(21) Appl. No.: 09/655,902

(22) Filed: Sep. 6, 2000

(51) Int. Cl.[7] .......................... A63F 13/00

(52) U.S. Cl. .......................... 463/25; 453/58; 194/215; 194/216

(58) Field of Search .......................... 463/25; 453/58; 194/215, 216

(56) References Cited

U.S. PATENT DOCUMENTS

| | | | | |
|---|---|---|---|---|
| 3,998,309 A | | 12/1976 | Mandas et al. | 194/97 |
| 4,084,677 A | * | 4/1978 | Searle et al. | 194/318 |
| 4,240,635 A | * | 12/1980 | Brown | 463/20 |
| 4,688,020 A | | 8/1987 | Kuehneman et al. | 340/365 VL |
| 4,692,571 A | | 9/1987 | Trinh et al. | 200/5 A |
| 5,380,008 A | * | 1/1995 | Mathis et al. | 273/143 R |
| 5,531,309 A | * | 7/1996 | Kloss et al. | 194/202 |
| 5,579,002 A | | 11/1996 | Iggulden et al. | 341/23 |
| 5,722,882 A | * | 3/1998 | Kashiwagi et al. | 453/11 |
| 5,725,428 A | * | 3/1998 | Achmuller | 463/20 |
| 5,759,102 A | * | 6/1998 | Pease et al. | 463/42 |
| 5,823,315 A | * | 10/1998 | Hoffman et al. | 194/203 |
| 6,000,520 A | * | 12/1999 | Dillon et al. | 194/202 |
| 6,012,981 A | * | 1/2000 | Fujioka et al. | 463/11 |
| 6,102,394 A | | 8/2000 | Wurz et al. | 273/138.2 |
| 6,135,887 A | | 10/2000 | Pease et al. | 463/42 |
| 6,251,014 B1 | | 6/2001 | Stockdale et al. | 463/16 |
| 6,263,392 B1 | * | 7/2001 | McCauley | 710/305 |
| 6,394,900 B1 | * | 5/2002 | McGlone et al. | 273/142 R |

FOREIGN PATENT DOCUMENTS

| | | | |
|---|---|---|---|
| EP | 0 738 991 A2 | 10/1996 | G07F/17/32 |
| EP | 0 953 930 | 11/1999 | |
| FR | 2 656 736 A1 | 7/1991 | H01H/13/70 |
| GB | 2 091 014 A | 7/1982 | G07F/17/34 |
| GB | 2 152 208 | 7/1985 | |
| GB | 2 326 505 A | 12/1998 | G07F/17/32 |
| WO | WO 94/24683 | 10/1994 | H01H/13/02 |
| WO | WO 99/61994 | 12/1999 | G06F/13/12 |

OTHER PUBLICATIONS

RS232 Specifications, http://www.sysman.co.za/modem/rs232.htm.*

RS232 Pinouts, http://www.connectworld.net/rs232.html.*

"GAMMA B Link Protocol," Gaming Manufacturers Association, 30 pages (Jan. 21, 2000).

* cited by examiner

*Primary Examiner*—Jessica Harrison
*Assistant Examiner*—Corbett Coburn
(74) *Attorney, Agent, or Firm*—Jenkens Gilchrist

(57) ABSTRACT

A gaming machine comprises a central processing unit and a local microcontroller. The CPU operates a gaming machine in response to a wager. The local microcontroller is distinct from and coupled to the central processing unit. The local microcontroller performs the low-level coin handling operations independent from the central processing unit.

29 Claims, 5 Drawing Sheets

GAMING MACHINE COIN HANDLING SYSTEM WITH DEDICATED LOCAL MICROCONTROLLER

FIELD OF THE INVENTION

The present invention relates generally to a coin handling system for gaming machines and, more particularly, to a coin handing system having a dedicated local microcontroller for handing low-level operations associated with the handling of coins input to the gaming machine.

BACKGROUND OF THE INVENTION

A conventional gaming machine receives coins input to the machine by a player such as a casino patron. The coins input to the gaming machine are processed by a coin mechanism which comprises a coin chute to receive coins, a coin accepting mechanism to validate the coins, and an optical gate to monitor the timing and the direction of coin travel. The validation of the coins by the coin accepting mechanism includes determining whether the correct coins or tokens were input to the gaming machine, generating an electronic pulse when the coins are determined to be valid, and routing a coin to a "valid" coin chute when deemed valid, or routing an invalid coin to an "invalid" coin chute when deemed invalid. The coin accepting mechanism and the optical gate are under the control of a central processing unit ("CPU"). The CPU includes coin handling driver software that continuously monitors the coin accepting mechanism and the optical gates. The coin accepting mechanism and the optical gates are interrupt driven devices which produce electrical signals indicative of the acceptance of a coin and the passage of the coin through the optical gate. The time difference between the acceptance of a coin by the coin accepting mechanism and the passage of the coin though the optical gate is measured. Once the optical gates are open by a passing coin, the electrical signals produced by the optical gates are periodically sampled in the order of many tens of times per second until the coin has passed though the optical gates thus closing the optical gates. A coin which is accepted by the coin accepting mechanism and passes through the optical gate in a timely manner is credited to the gaming machine. Because the CPU must perform a variety of other tasks, its overall performance is diminished by having to perform low-level coin handling operations in addition to these other tasks. The performance of the CPU is further diminished in "fast feeding" situations wherein a player inputs several coins to the gaming machine in a small period of time.

SUMMARY OF THE INVENTION

To overcome the aforementioned drawback, the present invention provides a coin handing system having a dedicated local microcontroller that assumes the low-level coin handing operations previously performed by the CPU in a conventional gaming machine. Because the local microcontroller performs the low-level coin handing operations, the CPU is free to provide better performance to other tasks.

In one embodiment of the present invention, a gaming machine comprises a CPU and a coin handling system. The CPU operates a gaming machine in response to a wager. The coin handling system includes a coin accepting mechanism, a detector, and a local microcontroller distinct from and coupled to the CPU. The coin handling system is coupled to and monitors the status of the coin accepting mechanism and the detector for electronic signals indicative of the intake of coins.

The CPU issues high-level commands related to the game play of the gaming machine. The high-level commands may, for example, include querying for coin acceptance status and commanding the coin handling system to accept or not to accept coins. However, to free up the CPU for other tasks, the local microcontroller performs low-level coin handling system operations related to the acceptance of coins. The low-level coin handing system operations may include, for example, sampling the state of the coin accepting mechanism and the detector, performing calculations, and responding with commands instructing the CPU to credit the coins to the game.

BRIEF DESCRIPTION OF THE DRAWINGS

The forgoing and other advantages of the invention will become apparent upon reading the following detailed description and upon reference to the drawings in which.

Figure 1:
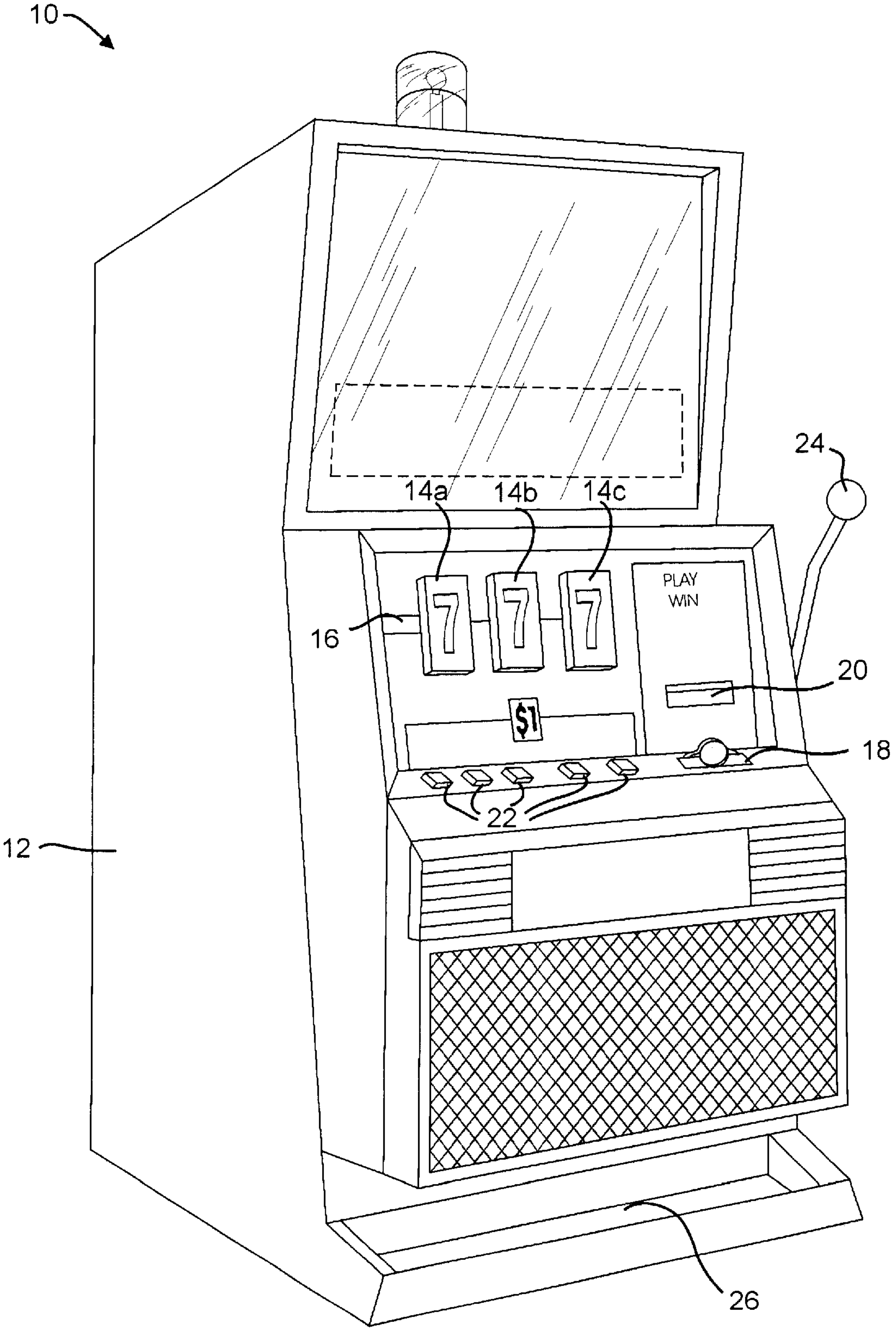
FIG. 1 is a perspective view of a gaming machine embodying the present invention.

While the invention is susceptible to various modifications and alternative forms, specific embodiments have been shown by way of example in the drawings and will be described in detail herein. However, it should be understood that the invention is not intended to be limited to the particular forms disclosed herein. Rather, the invention is to cover all modifications, equivalents, and alternatives falling within the spirit and scope of the invention as defined by the appended claims.

DESCRIPTION OF THE ILLUSTRATIVE EMBODIMENTS

Turning now to the drawings, FIG. 1 depicts a gaming machine 10 embodying the present invention. While the type of gaming machine illustrated in FIG. 1 is a slot machine, the present invention is applicable other types of gaming machines as well such as, for example, video lottery terminals and video poker machines. Further, other coin accepting machines such as amusement games and vending machine may also embody the present invention. The gaming machine 10 includes a cabinet 12 housing a plurality of symbol-bearing reels 14*a–c* which may be mechanical reels physically disposed within the cabinet 12 or, alternatively, images simulating the reels displayed on a video screen (not shown) disposed within the cabinet 12. Either way, the symbol-bearing reels 14 are rotated and stopped to place the symbols of each reel 14 in visual association with at least one pay line 16. Each of the reels 14 includes a number of discrete stop positions each of which corresponds to a respective symbol on the reel 14. The gaming machine 10 may incorporate any number of reels 14, and each can include any reasonable number of stop positions. While FIG. 1 illustrates a slot machine, the present invention is applicable other types of gaming machines as well such as, for example, video lottery terminal and video poker machines. Further, other coin accepting machines such as amusement games and vending machine also may embody the present invention.

To initiate game play, a player makes a wager by inserting coins into a coin slot 18, bills into a bill acceptor 20, or playing a number of credits. If the gaming machine 10 includes more than one pay line 16, the gaming machine 10 may automatically activate a number of pay lines corresponding to the number of coins or credits played. In addition, the gaming machine 10 may include keys on a button panel 22 that allow the player to select the number of pay lines 16 to play and to select the number of coins or credits to wager on the selected pay lines.

In response to the wager, a "start" button and/or handle 24 is enabled. By depressing the start button or pulling the handle 24, the player causes a CPU housed within the gaming machine's cabinet 12 to set the reels 14*a–c* in motion. The CPU uses a random number generator to select a game outcome corresponding to a particular set of reel stop positions. The reels 14 are then stopped at the selected set of stop positions. The symbols graphically illustrate the reel stop positions and indicate whether the stop positions of the reels 14 represent a winning game outcome. Winning game outcomes (e.g., symbol combinations resulting in payment of coins or credits) are identifiable to the player by a pay table affixed to the machine. A winning game outcome occurs when the symbols appearing on the reels 14 along an active play line corresponding to one of the wining combinations on the pay table. If the desired symbols stop in a winning combination, the CPU credits the player an amount corresponding to the award in the pay table for that combination multiplied by the amount of credits wagered on the winning pay line. The player may collect the amount of accumulated credits in a coin tray 26 by depressing a "Collect" button on the button panel 22.

An example of a pay table for the gaming machine is shown below:

| WINNING COMBINATION | | | PAYOFF |
|---|---|---|---|
| 7 | 7 | 7 | 200 |
| 3 Bar | 3 Bar | 3 Bar | 100 |
| 2 Bar | 2 Bar | 2 Bar | 40 |
| 1 Bar | 1 Bar | 1 Bar | 10 |
| Any Bar | Any Bar | Any Bar | 5 |

The pay table enables the player to view the winning combinations and their associated payoff amounts. From the pay table it can be seen that three of the same symbols along an active pay line generates a payoff for the following symbols: 7, 3 Bar, 2 Bar, 1 Bar, and Blank. Also, a mixed combination of the Bar symbols generates a payoff. The game may, of course, be modified to vary the payoffs associated with the winning combinations that do not span all of the reels and/or have other symbols such as fruit symbols or theme-based symbols.

Figure 2:
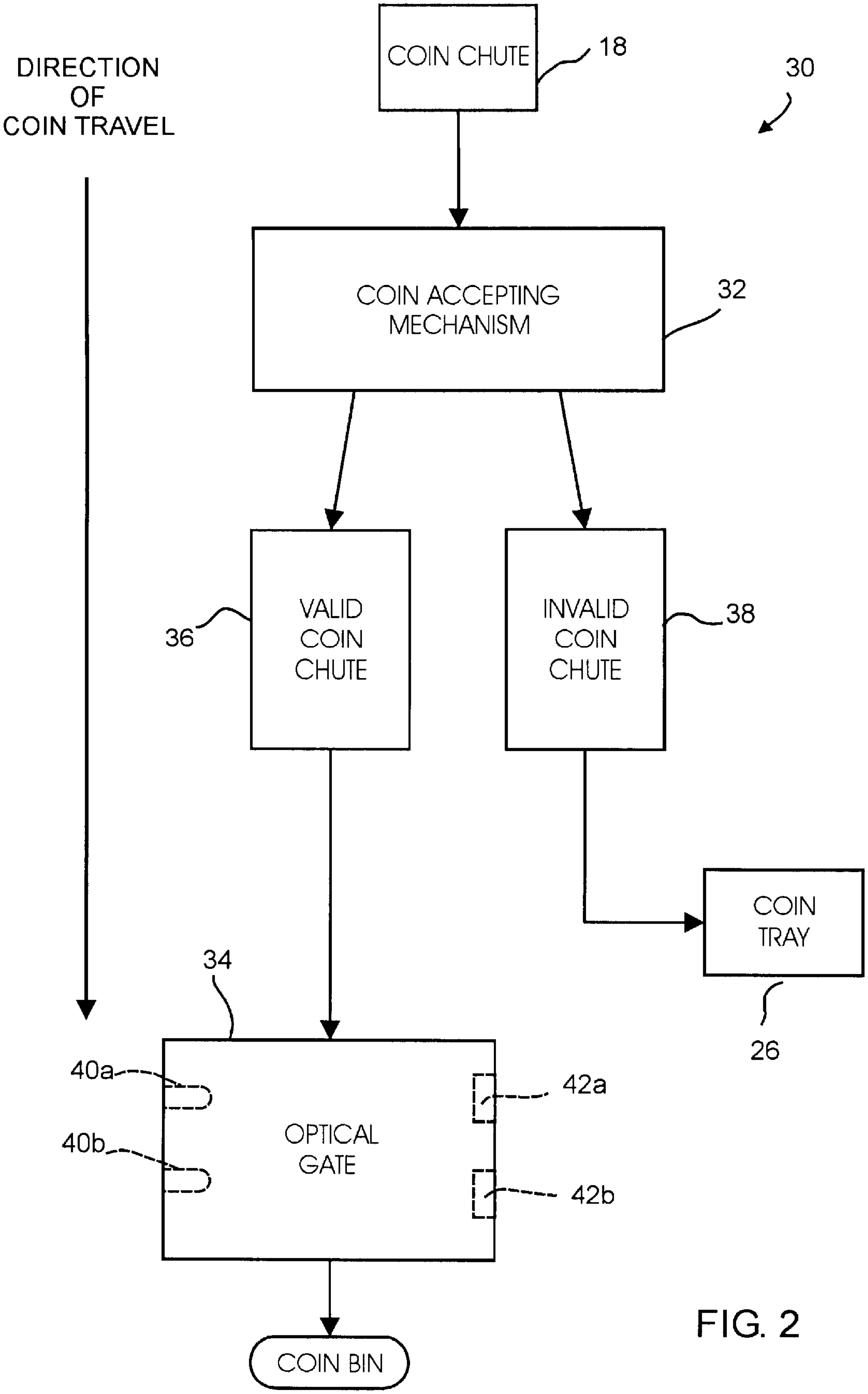
FIG. 2 is a functional block diagram of the components of a coin handing system of a gaming machine that physically handles coins input to the gaming machine according to one embodiment of the present invention.

Referring now to FIG. 2 a schematic representation of the components of a coin handling system 30 that physically handle the coins input to a gaming machine 10. The illustrated components are disposed in the cabinet 12 of the gaming machine 10. When a player initiates game play by inserting a coin into the coin chute 18, the coin handling system processes the input coin and accepts the coin if appropriate and then signals the CPU to credit the coin to the game. A coin input to the gaming machine 10 via coin chute 18 travels through the coin handling system 30 of the gaming machine 10 under the force of gravity in the direction indicated. The coin handling system 30 includes a coin accepting mechanism 32 for determining the validity of coins, and an optical gate 34 for monitoring the passage of coins to a "valid" coin path 36. An "invalid" coin path 38 routes coins deemed invalid by the coin accepting mechanism 32 back to the player via coin tray 26.

The coin accepting mechanism 32 contains an internal switch to route a coin to one of two outputs leading to the valid 36 and invalid 38 coin paths, respectively. Once the determination of validity is made, the coin accepting mechanism 32 automatically routes the coin to the valid coin chute 38. The determination of validity may be based on a variety of parameters including diameter, thickness, alloy content, and/or embossing features. For example, one embodiment of the gaming machine 10 may be a "quarter slot machine" which only accepts U.S. quarters and/or twenty-five cent casino tokens and will reject any other coin(s) deposited into the coin slot 18 of the gaming machine 10 such as a U.S. nickel. The coin accepting mechanisms 32 of the gaming machine 10 can be anyone of a variety of commercially available coin accepting mechanisms such as, for example, the Coin Comparitor®, Model No. CC-16, from Coin Mechanisms, Inc. of Glendale Heights, Ill. or the NRI Electronic Coin Validator, Model No. System G-13-6100, from National Rejectors, Inc. which is commercially available from Happ Controls, Inc. of Elk Grove, Ill.

In operation, valid coins are input to the gaming machine 10 via the coin slot 18 to the coin accepting mechanism 32. Once a coin input to the gaming machine 10 is released by the player, the coins falls under the force of gravity in the direction indicated by the arrow until reaching a coin retaining area disposed within the cabinet 12 of the gaming machine 10. Essentially, the gaming machine 10 is able to receive and processes coins as quickly as the player can feed coins into the coin slot 18. For example, the above-mentioned Coin Comparitor® is capable of validating coins at a rate of about seven coins per second. Other commercially available coin accepting mechanisms are capable of operating at faster or slower rates. After entering the coin accepting mechanism 32 a validity test is performed. Upon validation, the coin accepting mechanism 32 generates an electrical signal indicative of the validity of a coin. The coin accepting mechanism 32 does not generate any electrical signals when a coin is routed to the invalid coin chute 38.

Figure 4:
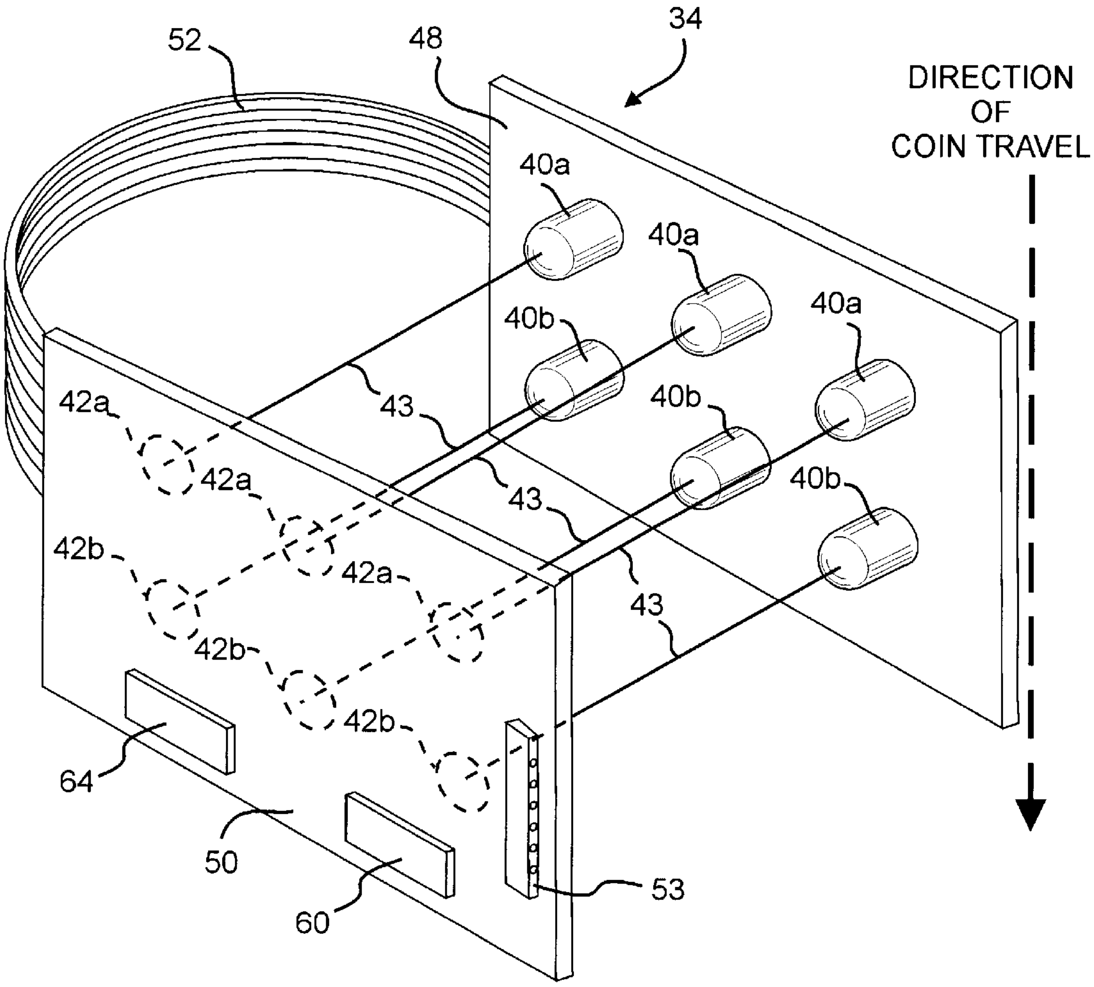
FIG. 4 is a perspective view of an optical gate of a gaming machine according to one embodiment of the present invention.

Referring also to FIG. 4, after a valid coin passes through the coin accepting mechanism 32, the coin then falls through an optical gate 34 disposed below the coin accepting mechanism 32. The optical gate 34 comprises two rows of light emitting diodes 40 ("LED") that illuminate corresponding optical sensors 42. The optical sensors 42 are photodetectors in one embodiment of the present invention. While the illustrated embodiment shows first and second rows of LEDs 40*a,b* and corresponding optical sensors 42*a,b*, in alternative embodiments of the present invention, the optical gate 34 may contain any reasonable number of LEDs 40 and corresponding optical sensors 42 arranged in a plurality of manners.

During normal operation, valid coins fall in the direction indicated by the arrow in FIG. 2. As a coin falls though the optical 34 gate, the coin "opens" the first row of optical sensors 42*a* and then the second row of optical sensors 42*b*, respectively. The surface area of the coin prevents the LEDs 40 from illuminating the corresponding optical sensors 42, thus opening the optical sensors 42. When the coin moves completely past an optical sensor 42, illumination from a corresponding LED 40 "closes" the sensor 42. Each of the optical sensors 42 are interrupt driven and generate electrical pulses as a coin opens each respective sensor. Upon being opened, the coin handling system 30 periodically samples the electrical pulses generated by each optical sensor 42*a* on the order of many tens of times per second until the coin moves past the optical sensor 42*a* thus closing the optical sensor 42*a*.

The optical gate 34 provides a security measure aimed at preventing the cheating (receiving a free credit) of the gaming machine 10 as well as to detect the presence of error conditions. In the past, coin operated machines were capable of being cheated by coins tethered to strings. According to this practice, an unscrupulous player lowers the tethered coin into the machine a distance sufficient to receive credit for inserting a coin, and then retracts the coin from inside the machine by pulling upward on the string. The optical gate 34 thwarts the potential cheater's efforts by not crediting a coin to the game which does not pass through the optical gate 34 in an appropriate manner. As the coin is falling, the coin handling system 30 monitors the rate at which the coin is falling through the optical gate 34 by measuring the time between the electrical pulse generated by the optical sensors 42. A coin free falling through the coin accepting area 30 should open and close each of the optical sensors 42*a* and 42*b* within a predetermined time range. The optical gate 34 aids in detecting the presence of error conditions along the path of coin travel which may be caused by attempts at cheating the gaming machine 10 or mechanical failures of the gaming machine 10. If a coin holds an optical sensor 42 open for an extended period of time, a "coin jam" error is detected. If a coin passes though optical gate but does so in a longer than normal time frame, a coin "long" error is detected. If the second row of optical sensors 42*b* are opened but the first row of optical sensors 42*a* have not been broken, or are not broken first, a coin "reverse" error is detected. Finally, if a coin is input to the coin handling system 30 but does not meet any other data requirements to be credited to the game, a coin "reject" error is detected.

Figure 3:
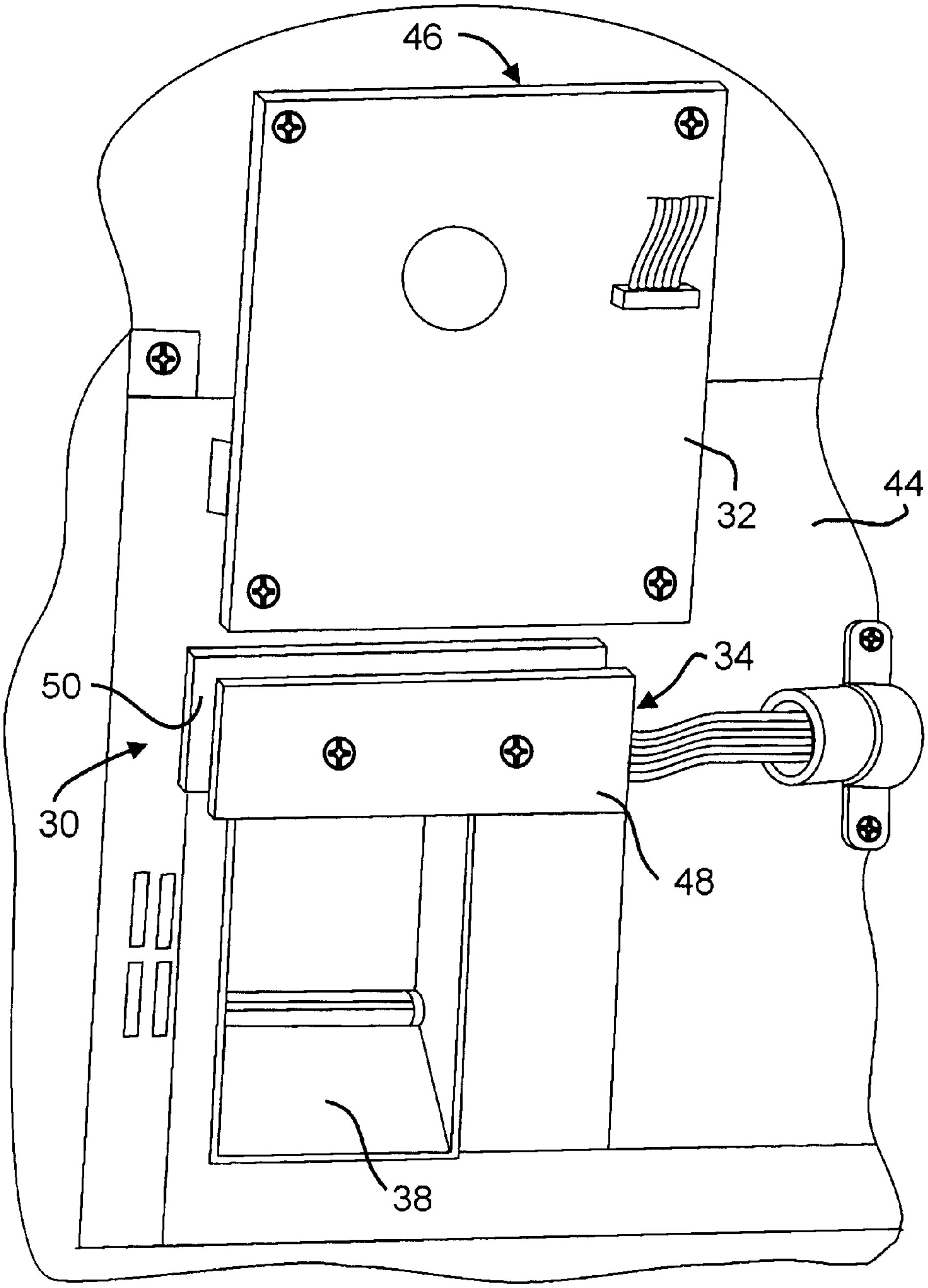
FIG. 3 is a perspective view of some of the components functionally illustrated in FIG. 2 that are installed in a gaming machine according to one embodiment of the present invention.

FIG. 3 illustrates several of the components of the coin handling system 30 functionally illustrated in FIG. 2 that are installed inside the cabinet 12 of the gaming machine 10. The coin accepting mechanism 32 is disposed above of the optical gate 34. The coin accepting mechanism 32 and the optical gate 34 are both mounted to a structure 44 disposed within the cabinet 12. The coin chute 18 (not shown in FIG. 3, shown in FIG. 2) directs coins to an inlet 46 of the coin accepting mechanism 34. Valid coins are directed to the valid coin chute 36 (not shown in FIG. 3, shown in FIG. 2) which routes valid coins to a coin bin (not shown) located within the cabinet 12. The valid coin chute 36 is disposed behind the structure shown in FIG. 2. The invalid coin chute 38 routes coins back to the player via the coin tray 26.

Referring back to FIG. 4, the optical gate 34 comprises a first 48 and a second 50 printed circuit board ("PCB") which are disposed opposite one another when mounted as shown in FIGS. 3 and 4. The optical sensors 42 are disposed on the first PCB 48 and the LEDs 40 are disposed on the second PCB 50. The first row of LEDs 40*a* and the corresponding first row of optical sensors 40*b* are disposed above the second row of LEDs 40*b* and the corresponding optical sensors 42*b*, respectively. A graphical representation of the illumination of the optical sensors 42 by the LEDs is labeled by reference number 43. A suitable cable 52 electrically couples the first and second PCBs. One of the PCBs 48,50 has a suitable connector 53 disposed thereon for connection to the remainder of the coin handling system 30. In alternative embodiments, a detector other than optical sensors may be utilized in the coin handling system. For example, magnetic sensors such as Hall-effect magnetic sensors can be used to monitor the passage of coins though the coin handling system 30.

Figure 5:
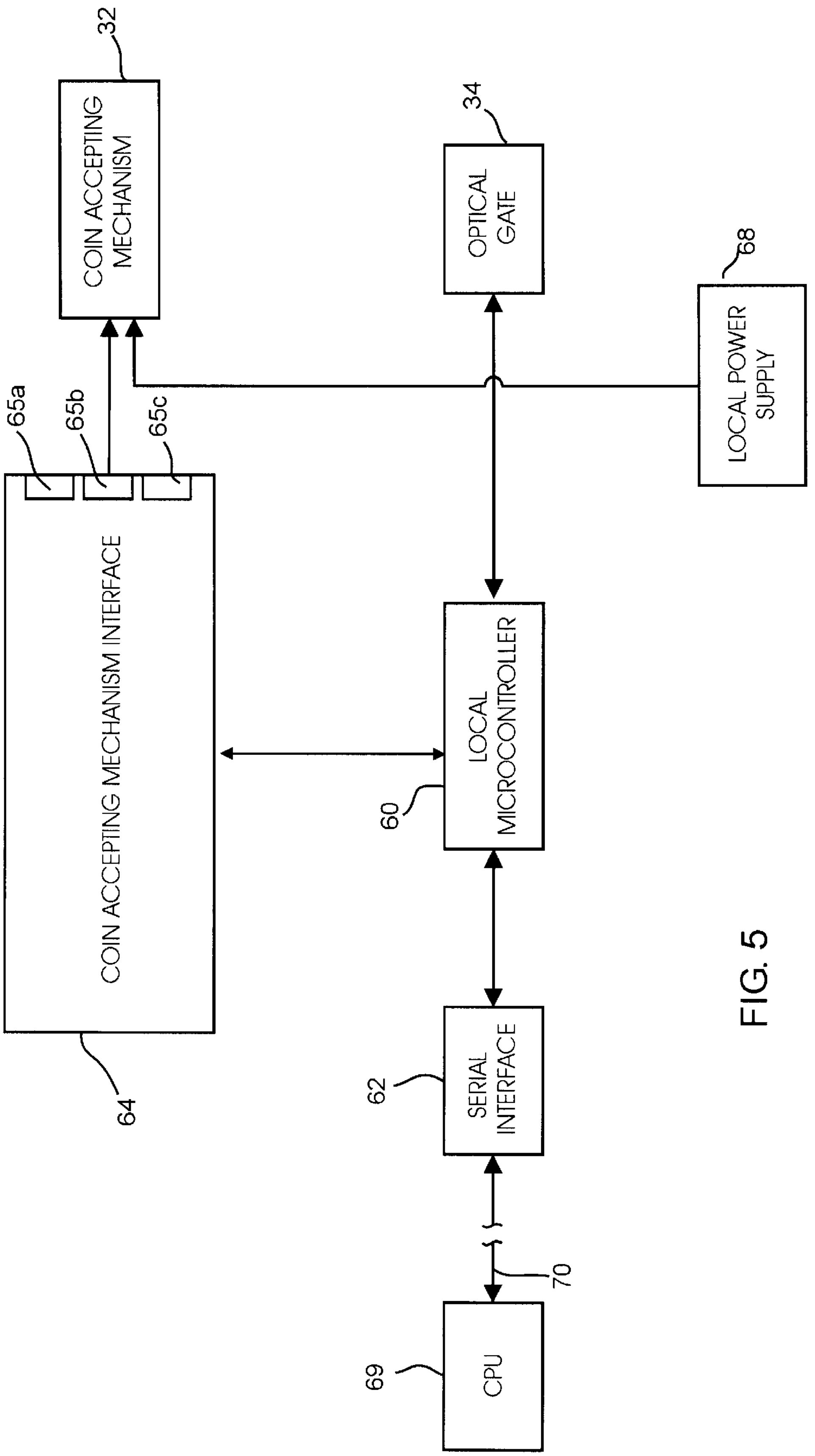
FIG. 5 is a functional block diagram of the electromechanical components of a coin handling system of a gaming machine according to one embodiment of the present invention.

Referring now to FIG. 5, in accordance with the present invention, the coin handling system 30 includes a dedicated local microcontroller 60, an interface 62, a coin acceptor interface 64 having a plurality of connectors 65*a–c*, and a local power supply 68. In one embodiment of the present invention, these components are mounted on the same printed circuit board. In an alternative embodiment of the present invention, these components can be mounted on one of the PCBs 48,50 comprising the optical gate 34 (see FIG. 4). The local microcontroller 60 is distinct from a main control unit or CPU 69 of the gaming machine but is coupled thereto by a bi-directional serial link 70. The serial link 70 comprises a single cable, and examples of suitable serial links are a Universal Serial Bus (USB), Firewire, RS-232, RS-485, or Ethernet link. The serial link 70 is connected to the serial interface 62 which, in turn, is connected to the local microcontroller 60. Alternatively, an interface other than the serial interface 62 and serial 70 is used to couple the local microcontroller 60 to the CPU 69. To receive signals from the coin accepting mechanism 32, the local microcontroller 60 is coupled to the coin accepting mechanism 32 by the coin accepting mechanism interface 64. The coin accepting mechanism 32 is powered by the local power supply 68, which may receive power from the gaming machine's main power supply. To monitor the flow of coins through the optical gate 34, the local microcontroller 60 is coupled to the optical gate 34.

While the CPU 69 of the gaming machine performs high-level tasks related to the operation of the gaming machine and the crediting of coins to the game, the local microcontroller 60 performs low-level coin handling operations related to the inputting of coins to the gaming machine 10. As indicated above, during normal operation, it is necessary to process the signals generated by the coin accepting mechanism 32 that are indicative of the validity of coins and the electrical pulses received from the optical gate 34 that indicate the optical sensors 42 are opened. In prior art gaming machines, this real-time task degraded the overall performance of the CPU. The real-time tasks of sampling the electrical pulses from the optical gate 34 and processing the signals from the coin accepting mechanism 32 are performed by the local microcontroller 60. After a coin passes though the optical gate 34, the local microcontroller 60 reconciles a signal indicating the validity of the coin generated by the coin accepting mechanism 34 and the electrical pulses generated by the optical gates 32. Specifically, the local microcontroller 60 keeps track of how many valid coin pulses the coin accepting mechanism 32 has sent, the number of times and amount of time optic sensors 42*a* and 42*b* are opened and closed, and the amount of time the coin takes to move entirely through both rows of optical sensors 42*a,b*. When the optical sensors 42*b* are re-opened after the coin has finally fallen through the system 30, the local microcontroller 60 and corresponding coin handling software processes all of this collected data and determines whether the coin that was processed through the coin handling system 30 should be credited to the game (e.g., the coin accepting mechanism 32 has accepted the coin and the coin has passed through the optical gate 34 in a timely manner) and an appropriate signal is generated by the local microcontroller 60 and sent to the CPU 69.

The local microcontroller 60 and a corresponding coin handling software driver are configured to be compatible with several commercially available coin accepting mechanisms 34 including those discussed above. The coin acceptor interface 64 is equipped with a plurality of connectors 65*a–c* for physically connecting any one of several commercially available coin accepting mechanisms 32 to the coin acceptor interface 64. For example, the above-mentioned Coin Comparitor® requires a six pin JST terminate interface and an operating voltage ranging from 15 Volts AC or DC through a maximum of 55 Volts AC. And the above-mentioned NRI Electronic Coin validator requires a ten pin connection and an operating voltage of ten to sixteen volts DC. Further, the signals generated upon a determination of coin validity vary among the various commercially available coin accepting mechanisms. Accordingly, the coin acceptor interface 64 is adapted to connect with any one of a plurality of commercially available coin accepting mechanisms so the coin handling system can employ one of many coin accepting mechanisms 32 without having to undergo significant hardware and software reconfigurations. Put another way, the coin handling system 30 having a dedicated local microcontroller 60 allows several of the plurality of commercially available coin mechanisms 32 to appear virtually identical to the CPU of the gaming machine 10.

With respect to power-up initialization, the local microcontroller 60 initializes and energizes the coin accepting mechanism 32 and the optical gate 34 and initializes all necessary coin handling software driver data. A synchronous process also begins at power-up. This iterative process monitors the time differences between coin validation at the coin accepting mechanism 32 and the passage of the coin past the two rows of optical sensors 42*a,b*. The process iteration interval is dependent upon the size of the coin, for example, whether the gaming machine 10 accepts U.S. quarters or a U.S. $1 casino tokens. After power-up initialization, the coin handling system 30 having a local microcontroller 60 reports a status state to querying devices and accepts commands from commanding devices. For example, the microcontroller 60 queries as to the type of coin accepting mechanism physically installed in the gaming machine 10 so that the local microcontroller 60 can operate in a mode corresponding to that specific coin accepting mechanism.

After power-up, the coin handling system 30 having a local microcontroller 60 monitors the coin accepting mechanism 32 and the optical sensors 34 for electrical pulses. The local microcontroller 60 monitors the coin handling system to ensure all necessary coin acceptance events have happened, in the correct order and time frame. Upon determination that the coin has passed though the electrical gate in an acceptable manner, the local microcontroller 60 generates a signal indicating that an acceptable coin has been input to the gaming machine 10.

With respect to game play, the local microcontroller is queried by the CPU for coin acceptance status. The local microcontroller 60 generates an acceptance signal indicating that a coin input to the gaming machine 10 has been deemed valid by the coin accepting mechanism 10 and has fallen though the optical gate 34 in a timely manner. Upon receiving the acceptance signal from the local microcontroller 60, the CPU issues credit to the game. Additionally, the local microcontroller reports the presence, or absence, of error conditions when queried for a status state by the CPU.

The simple, low-cost local microcontroller 60 is advantageous in that it assumes the low-level coin handling operations previously performed by the CPU of prior art gaming machines. Because the local microcontroller 60 performs the low-level coin handling operations, the CPU 69 is free to provide better performance for other tasks. The CPU 69 can process data quicker and increase the speed of the overall game. Examples of suitable local microcontrollers 60 for the present invention are Cypress Universal Serial Bus microcontrollers manufactured by Cypress Semiconductor Corp., C541U Family Multipurpose Microcontroller with On-Chip USB Module manufactured by Siemens AG, and certain microcontrollers from ST Microelectronics.

In addition, the local microcontroller 60 allows for the use of the serial link 70 between the coin handling system 30 and the CPU 69. The serial link 70 is in the form of a single cable, which is advantageous because it replaces the more costly and complex bundle of wires found between the coin mechanisms—the coin accepting mechanism and the optical gate—and the CPU of prior art gaming machines. The serial link 70 reduces the cost to manufacture the gaming machine, improves the reliability of the gaming machine, and facilitates future modifications to the coin handling system 30.

While the present invention has been described with reference to one or more particular embodiments, those skilled in the art will recognize that many changes may be made thereto without departing from the spirit and scope of the present invention. Each of these embodiments and obvious variations thereof is contemplated as falling within the spirit and scope of the claimed invention, which is set forth in the following claims.

What is claimed is:

1. A gaming machine, comprising:

a central processing unit for operating the gaming machine in response to a wager;

a coin path adapted to receive coins input to the gaming machine and to guide coins to one or more outputs;

a coin accepting mechanism disposed along the coin path adapted to determine validity of each of the coins and to generate a signal indicative of the validity of each of the coins;

one or more sensors distinct from the coin accepting mechanism disposed along the coin path and adapted to generate signals in response to coin movement past the sensors;

a local microcontroller distinct from and coupled to the central processing unit, the local microcontroller coupled to the coin accepting mechanism and the sensors and adapted to receive signals from the coin accepting mechanism and the sensors, the local microcontroller adapted to perform low-level coin handling operations independent from the central processing unit; and an adapter interface for coupling the coin accepting mechanism to the local microcontroller, the adapter interface being adapted to couple one of a plurality of different types of coin accepting mechanisms to the local microcontroller, the adapter interface including a plurality of different types of connectors adapted to receive the plurality of different types of coin accepting mechanisms, the adapter interface being adapted to transmit the signal indicative of the validity of a coin from the coupled coin accepting mechanism to the local microcontroller regardless of the coupled type of coin accepting mechanism.

2. The gaming machine of claim 1 wherein the low-level coin handing operations include processing the signal indicative of the validity of each of the coins generated by the coin accepting mechanism.

3. The gaming machine of claim 1 wherein the low-level coin handling operations includes frequently sampling the signals generated by the one or more sensors to determine whether a coin moves past the sensors in a predetermined time range and in a predetermined direction.

4. The gaming machine of claim 3 wherein the local micro-controller is adapted to generate an accept coin signal when a coin moves past the sensors in an acceptable manner.

5. The gaming machine of claim 1 wherein the one of more sensors includes first and second sensors linearly aligned parallel to the coin path.

6. The gaming machine of claim 1 wherein the one or more sensors are optical sensors, the gaming machine further comprising a plurality of light emitting diodes disposed adjacent the transport path opposite the optical sensors, the plurality of light emitting diodes adapted to illuminate the optical sensors.

7. The gaming machine of claim 1 wherein the local microcontroller is serially connected to the central processing unit.

8. The gaming machine of claim 1 wherein the local microcontroller and the one or more sensors are mounted on a common printed circuit board.

9. The gaming machine of claim 8 where the coin accepting mechanism interface is mounted on the common printed circuit board.

10. The gaming machine of claim 1 wherein the local microcontroller is configured to process signals indicative of the validity of a coin from a plurality of different types of coin accepting mechanisms.

11. The gaming machine of claim 1 wherein the central processing unit issues high-level commands to the local microcontroller, the high level commands including a start accepting coins command so that coins may be credited the game and a stop accepting coins command so that coins are not credited to the game.

12. A gaming machine, comprising:

a central processing unit for operating the gaming machine in response to a wager;

a coin path adapted to receive coins input to the gaming machine and to guide coins moving under the force of gravity to one or more outputs;

a coin accepting mechanism disposed along the coin path adapted to determine the validity of each of the coins and to generate a signal indicative of the validity of each of the coins;

a first sensor row of optical sensors and a second row of optical sensors, the optical sensors being distinct from the coin accepting mechanism, the first and second rows of optical sensors mounted on a sensor printed circuit board disposed adjacent the coin path, the first row of optical sensors disposed substantially parallel to the second row of optical sensors, the first and second rows of optical sensors disposed substantially perpendicular to the transport path, each of the optical sensors in the first and second rows of optical sensors adapted to generate signals in response to the movement of coins past each of the sensors; and a local microcontroller distinct from and coupled to the central processing unit, the local microcontroller mounted on the sensor printed circuit board, the local microcontroller coupled to the coin accepting mechanism and each of the optical sensors and adapted to receive signals from the coin accepting mechanism and each of the optical sensors, the local microcontroller adapted to perform low-level coin handling operations independent from the central processing unit including processing signals received from the coin accepting mechanism and frequently sampling the signals received from the optical sensors to determine the direction of coin travel and the time for a coin to move past the first and second rows of optical sensors, the local microcontroller generating an accept coin command when a coin has past the first and second rows of optical sensors in an acceptable manner; and a coin accepting mechanism interface for coupling the coin accepting mechanism to the local microcontroller, the coin accepting mechanism interface being mounted on the sensor printed circuit board, the a coin accepting mechanism interface being adapted to couple any one of a plurality of different types of coin accepting mechanisms to the local microcontroller, the coin accepting mechanism interface including a plurality of different types of connectors adapted to receive the plurality of different types of coin accepting mechanisms.

13. The gaming machine of claim 12 wherein the local microcontroller is serially connected to the central processing unit.

14. The gaming machine of claim 12 wherein the local microcontroller is configured to process signals indicative of the validity of a coin from a plurality of different types of coin accepting mechanisms.

15. The gaming machine of claim 12 wherein the central processing unit issues high-level commands to the local microcontroller, the high level commands including a start accepting coins command so that coins may be credited the game and a stop accepting coins command so that coins are not credited to the game.

16. The gaming machine of claim 12 wherein low-level coin handling operations include detecting the presence of a plurality of error conditions when a coin has not passed the first and second sensor rows in an acceptable manner.

17. The gaming machine of claim 16 wherein the central processing unit issues high-level commands to the local microcontroller, the high level commands including a status query command, and wherein the local microcontroller is adapted to generate a signal indicative of the presence or absence of error conditions.

18. A gaming machine, comprising:

a central processing unit for operating the gaming machine in response to a wager;

a coin accepting mechanism; and an adapter interface system coupling the coin accepting mechanism to the central processing unit, the adapter interface system being adapted to couple any one of a plurality of different types of coin accepting mechanisms to the central processing unit, the adapter interface system including a plurality of different types of connectors adapted to physically connect with the plurality of different types of coin accepting mechanisms, the adapter interface system permitting the plurality of different types of coin accepting mechanisms to be substantially compatible with the central processing unit independent of which of the plurality of different types of coin accepting mechanism is coupled to the central processing unit.

19. The gaming machine of claim 18 wherein the adapter interface system includes a local microcontroller distinct from the central processing unit, the local microcontroller performing low-level coin handling operations independent from the central processing unit including whether to command the central processing unit to issue credit for an input coin.

20. The gaming machine of claim 18 wherein the coin accepting mechanism is adapted to evaluate the validity of a coin input to the gaming machine and to generate a valid coin signal indicative of the validity of a valid input coin.

21. The gaming machine of claim 20 wherein the plurality of different types of coin accepting mechanisms generate different types of valid coin signals, the adapter interface system adapted to reconcile the different types of valid coin signals and to communicate a valid coin signal to the central processing unit.

22. The gaming machine of claim 18 wherein the coin accepting mechanism is adapted to generate a valid coin signal indicative of the validity of a valid coin inputted in the gaming machine, the adapter interface system being adapted to communicate the valid coin signal to the central processing unit regardless of which of the plurality of different types of coin accepting mechanism is coupled thereto.

23. A gaming machine, comprising:

a central processing unit for operating the gaming machine in response to a wager;

a coin accepting mechanism for evaluating the validity of a coin input to the gaming machine; and an adapter interface system linking the coin accepting mechanism to the central processing unit, the adapter interface system being adapted to communicatively link a plurality of different types of coin accepting mechanisms, one at a time, to the central processing unit, the adapter interface system including a plurality of different types of connectors adapted to physically connect the plurality of different types of coin accepting mechanisms to the adapter interface system.

24. The gaming machine of claim 23 wherein the adapter interface system communicates a signal generated by the linked coin accepting mechanism to the central processing unit regardless of the type of signal generated by the linked types of coin accepting mechanism, wherein the plurality of different types of coin accepting mechanisms are adapted to generate a plurality of different signals upon a determination of coin validity.

25. The gaming machine of claim 23 wherein the adapter interface system includes a local microcontroller distinct from the central processing unit, the local microcontroller performing low-level coin handling operations independent from the central processing unit including whether to command the central processing unit to issue credit for an input coin.

26. A gaming machine, comprising:

a central processing unit for operating the gaming machine in response to a wager; and an adapter interface system for coupling and adapting any of a plurality of different types of coin accepting mechanisms to the central processing unit, the adapter interface system including a plurality of different types of connectors adapted to physically connect the plurality of different types of coin accepting mechanisms to the adapter interface system.

27. The gaming machine of claim 26 wherein the plurality of different types of coin accepting mechanisms generate different types of valid coin signals, the adapter interface system adapted to reconcile the different types of valid coin signals and to communicate a valid coin signal to the central processing unit.

28. The gaming machine of 26 wherein the adapter interface system includes a local microcontroller distinct from the central processing unit, the local microcontroller making the plurality of different types of coin accepting mechanisms appear substantially identical to the central processing unit.

29. The gaming machine of claim 28 wherein the local microcontroller performs low-level coin handling operations independent from the central processing unit including whether to command the central processing unit to issue credit for an input coin.

* * * * *